(12) United States Patent
Moore et al.

(10) Patent No.: US 10,913,018 B2
(45) Date of Patent: Feb. 9, 2021

(54) SPRING BIASED FILTER ELEMENT

(71) Applicant: Baldwin Filters, Inc., Kearney, NE (US)

(72) Inventors: Jonathan D. Moore, Manchester, CT (US); Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 859 days.

(21) Appl. No.: 15/613,436

(22) Filed: Jun. 5, 2017

(65) Prior Publication Data

US 2018/0345187 A1 Dec. 6, 2018

(51) Int. Cl.
*B01D 35/153* (2006.01)
*B01D 35/157* (2006.01)
*B01D 35/147* (2006.01)
*B01D 29/21* (2006.01)

(52) U.S. Cl.
CPC ......... *B01D 35/1475* (2013.01); *B01D 29/21* (2013.01); *B01D 35/1573* (2013.01); *B01D 2201/291* (2013.01)

(58) Field of Classification Search
CPC .............. B01D 35/157; B01D 35/153; B01D 35/1573; B01D 35/1475; B01D 29/21; B01D 2201/291
USPC ................................................ 210/234, 235
See application file for complete search history.

(56) References Cited

U.S. PATENT DOCUMENTS

| 7,147,110 | B2 | 12/2006 | Clausen et al. |
| 7,392,783 | B2 * | 7/2008 | Jensen ................ B01D 35/153 |
| | | | 123/198 D |
| 8,691,090 | B2 | 4/2014 | Schachtrup et al. |
| 2006/0096934 | A1 | 5/2006 | Weinberger et al. |
| 2009/0184045 | A1 | 7/2009 | Stamey, Jr. et al. |
| 2010/0140151 | A1 | 6/2010 | Stamey, Jr. et al. |
| 2012/0031822 | A1 | 2/2012 | Lepine et al. |

OTHER PUBLICATIONS

International Search Report and Written Opinion dated Feb. 27, 2018 (PCT/US2017/035894).

* cited by examiner

*Primary Examiner* — Thomas M Lithgow
(74) *Attorney, Agent, or Firm* — Alix, Yale & Ristas, LLP (57) ABSTRACT

A filter element for use in a housing of a filter assembly having a cover and a seal therebetween. The housing includes inlet and outlet valves. The filter element comprises a first endcap and a second endcap including an inlet valve actuator. A cylindrical ring of filter media extends axially between the first and second endcaps and surrounds a center tube that defines an outlet having an outlet valve actuator. A sleeve positioned to receive and exert force in a first and second direction surrounds a bias member. Threading the cover to the housing compresses the bias member causing the inlet and outlet valve actuators to actuate the inlet and outlet valves. Removing the cover causes extension of the bias member and the inlet and outlet valve actuators to retreat from the inlet and outlet valves before the seal between the cover and the housing is broken.

18 Claims, 7 Drawing Sheets

SPRING BIASED FILTER ELEMENT

FIELD OF THE INVENTION

The present disclosure relates to a filter element for use in a filter enclosure. Particularly, a filter element for filtering the coolant of an internal combustion engine.

BACKGROUND

In an automobile, heat balance is integral to maintaining engine temperature. Flowing through a coolant circuit, coolant absorbs heat and subsequently expels the heat through the radiator of the automobile. In the process, the coolant encounters and accumulates rust, scale formation and various other particulates and debris. Therefore, the use of a coolant filter assembly is pivotal in removing contaminants to maintain a proper heat control system.

In a typical cooling system, a filter element is positioned within a housing of the coolant filter assembly. Hot coolant carrying contaminants enters the housing through an inlet. During operation, pressure is built up within the housing and throughout the coolant circuit. When removing and replacing a filter element, a service person usually must unscrew a cover to the housing in order to extract the used filter. If proper safeguards are not in place, hot coolant can spurt out and injure the service person removing the filter.

To ensure safety, the inlet allowing hot, unfiltered coolant into the housing must be closed prior to the cover being fully removed from the housing. Prior art filter assemblies can be costly, require more parts and necessitate training to change the filter element, as these assemblies are only offered and function in combination and not independent of each other. Therefore, there is a need in the art for a replaceable filter element that can be used in the housing of a filter assembly, without replacing the entire filter assembly.

SUMMARY

In the illustrated embodiment, a spring biased filter element (hereinafter, "filter element") is disclosed. The filter element is for use in a housing of a filter assembly having a cover and a seal therebetween. The disclosed filter element ensures safety during removal of the filter element from the filter assembly by incorporating components that enable the filter element to shut off the flow of fluid entering the housing of the filter assembly before the seal between the cover and the housing is no longer effective.

The housing defines an inlet having an inlet valve and an outlet having an outlet valve. The filter element comprises a first (upper) endcap including a handle and a second (lower) endcap including an inlet valve actuator. The inlet valve actuator is a ring protruding from the second endcap. A cylindrical ring of filter media circumscribes a longitudinal axis and extends axially between the first and second endcaps. The filter media surrounds a coaxial center tube that defines an outlet of the filter element. The outlet of the filter element includes an outlet valve actuator. A sleeve concentric and contiguous with the center tube defines a cavity and surrounds a bias member. The sleeve is positioned to receive and exert force in first direction and second directions to allow for compression and extension of the bias member.

When the filter element is positioned within the housing, threading the cover to the housing exerts force on the first endcap and compresses the bias member. The inlet and outlet valve actuators are positioned such that compression of the bias member causes the inlet and outlet valve actuators to actuate the inlet and outlet valves, allowing fluid to flow in and out of the housing. Removing the cover from the housing relieves the force exerted on the first endcap and causes the bias member to extend. Extension of the bias member causes the inlet and outlet valve actuators to retreat from the inlet and outlet valves. The seal is positioned a distance from a first (upper) end of the housing that is greater than the distance the inlet and outlet valve actuators must retreat to cause the inlet and outlet valves to close and shut off the flow of fluid entering and leaving the housing. In this manner, the inlet and outlet valves are closed before the seal between the cover and the housing is opened and fluid is not able to spurt out during removal of the filter element.

DETAILED DESCRIPTION

An embodiment of a filter element according to aspects of the disclosure will now be described with reference to FIGS. 1-5, wherein like numerals represent like parts. The disclosed embodiment of a filter element will generally be referred to by the reference numeral 10. The filter element 10 is contemplated for use within a housing 100 of a coolant filter assembly. Various materials, methods of construction and methods of fastening will be discussed in the context of the disclosed embodiment. Those skilled in the art will recognize known substitutes for the materials, construction methods, and fastening methods, all of which are contemplated as compatible with the disclosed embodiment and are intended to be encompassed by the appended claims.

A typical filter assembly includes a housing 100 having a generally cylindrical sidewall 110 extending between a first (upper) end 120 and a second end (lower) 130. A removable cover 122 having a seal 124 (FIG. 4) can be fastened to and removed from the first end 120. When fastened, the seal 124 is positioned a distance $D_1$ from an upper edge of the housing 100 such that when the cover 122 is partially removed, the seal 124 is still effective in sealing the housing 100. In the disclosed embodiment, it is contemplated that the cover 122 and the housing 100 are threaded such that the cover 122 is screwed on and off. The second end 130 of the housing defines an inlet 140 having an inlet valve 142 and an outlet 150 having an outlet valve 152. The outlet 150 returns filtered fluid to a fluid circuit. The filter element 10 is inserted into the housing 100 and the cover 122 is screwed onto the first end 120. In this arrangement, the inlet valve 142 is open and dirty fluid flows through the inlet 140.

Figure 1:
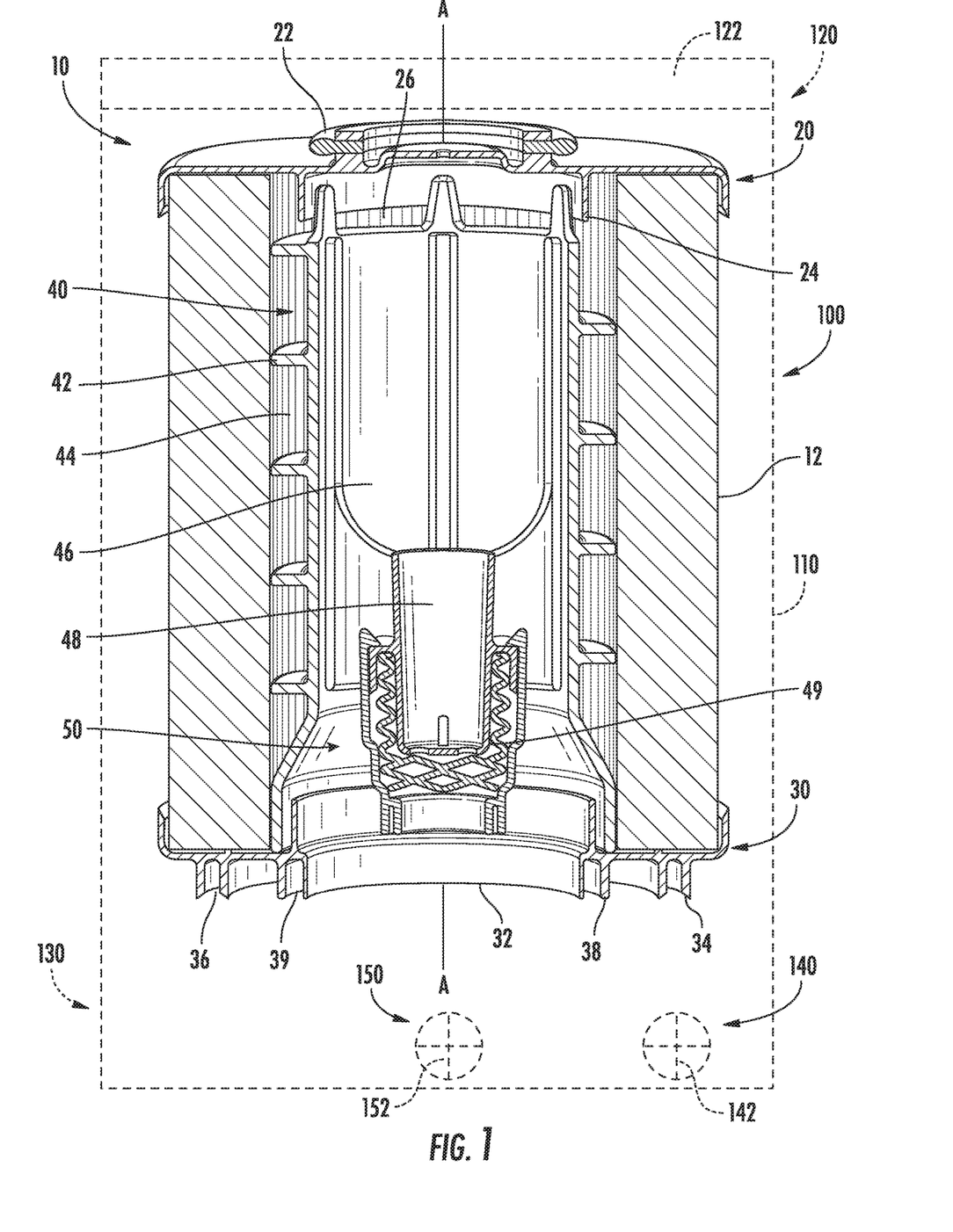
FIG. 1 is a front cross-sectional view of one disclosed embodiment of a filter element according to aspects of the disclosure.

As shown in FIG. 1, the filter element 10 has a longitudinal axis A-A and includes a cylindrical ring of filter media 12, a first (upper) endcap 20, a second (lower) endcap 30, a center tube 40, a movable support assembly 50 and an inlet valve actuator ring 34. The filter media 12 is coaxial to the longitudinal axis A-A and extends between the first and second endcaps 20, 30. The filter media 12 circumscribes the center tube 40, which also extends between the first and second endcaps 20, 30. In the disclosed embodiment, the filter media 12 is chosen from a suitably permeable, fibrous material and attached in a fluid tight relationship to the first and second endcaps 20, 30.

Figure 2:
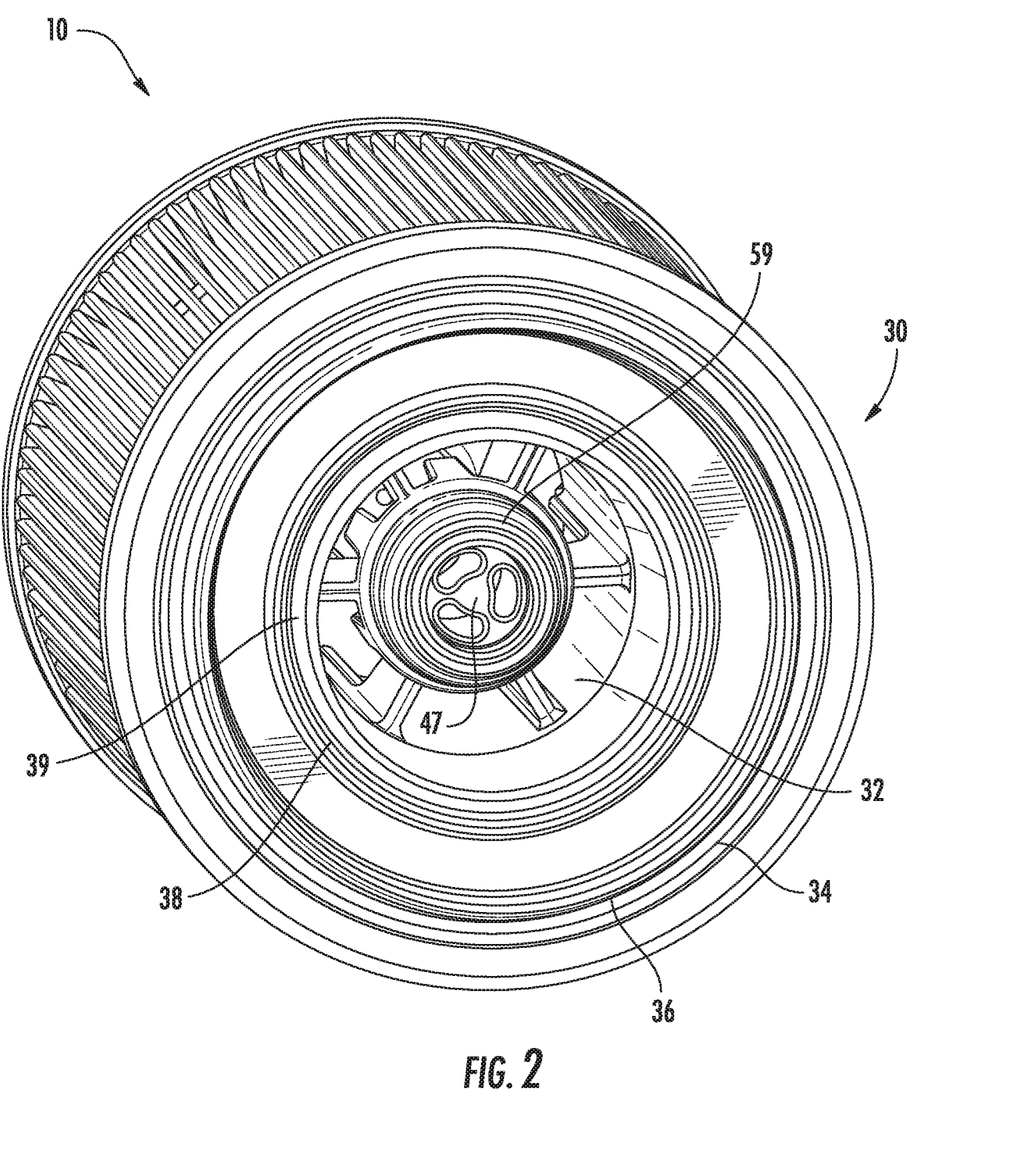
FIG. 2 is a bottom perspective view of the disclosed embodiment of FIG. 1.
Figure 4:
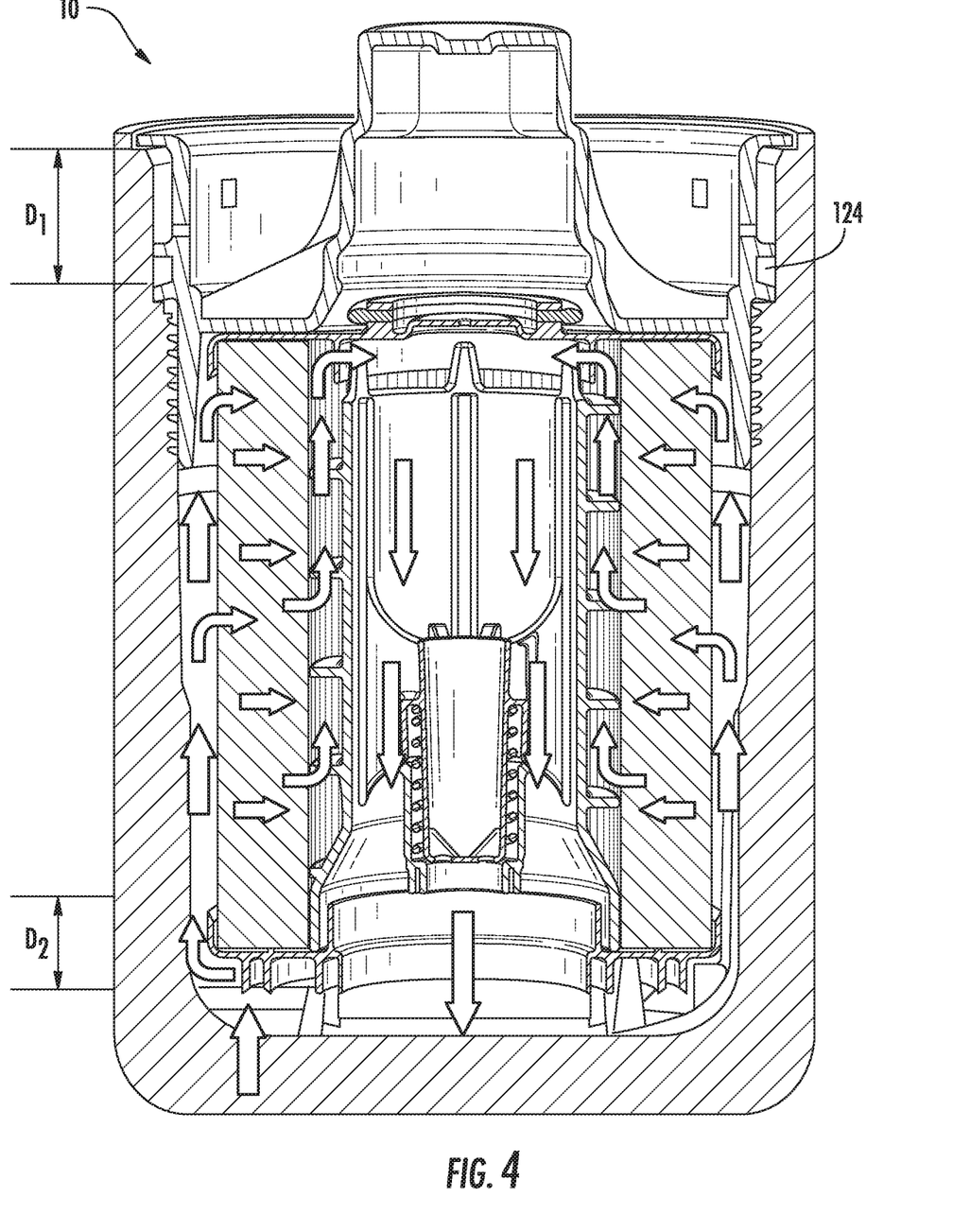
FIG. 4 is a cross-sectional view of the disclosed embodiment of FIG. 1 depicting the flow path of a fluid.
Figure 5:
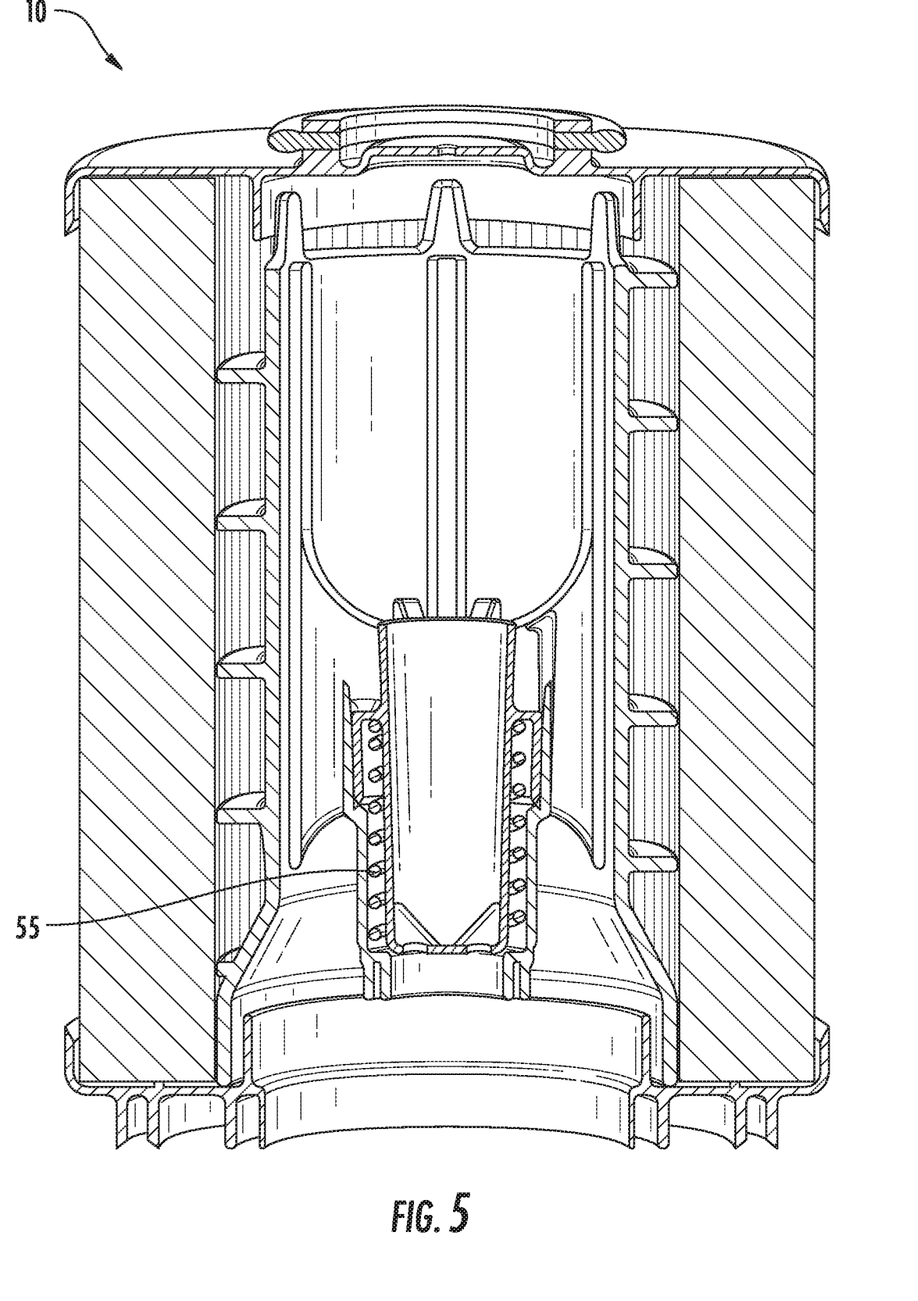
FIG. 5 is a cross-sectional view of the disclosed embodiment of FIG. 1 depicting an alternative bias member.

As shown in FIGS. 1 and 2, the second endcap 30 defines a fluid flow opening 32 coaxial with the longitudinal axis A-A. The inlet valve actuator 34 is present on the second endcap 30 and is concentric with the fluid flow opening 32. The inlet valve actuator 34 protrudes from the second endcap 30 and defines a groove 36. The inlet valve actuator 34 is configured to open the inlet valve 142 in the inlet 140. A filter element positioning ring 38 defining a groove 39 is intermediate and concentric with the fluid flow opening 32 and the inlet valve actuator 34. The positioning ring 38 centers the filter element 10 in the second end 130 of the housing 100. In this orientation, the inlet valve actuator 34 is capable of engaging and opening the inlet valve 142. As shown in FIG. 4, when the inlet valve 142 is open, dirty fluid flows through the inlet 140 and is circulated radially about the filter element 10 and passes through the filter media 12.

The first endcap 20 has a top and bottom surface. The top surface includes a handle 22 or other compatible means to grip the filter element 10 for removal from the housing 100. The bottom surface includes an annulus 24 extending toward and connecting to the center tube 40. A plurality of fluid flow apertures 26 are longitudinally intermediate the annulus 24 and the center tube 40. The apertures 26 are configured to allow fluid that has passed through the filter media 12 to flow into the center tube 40.

Figure 3:
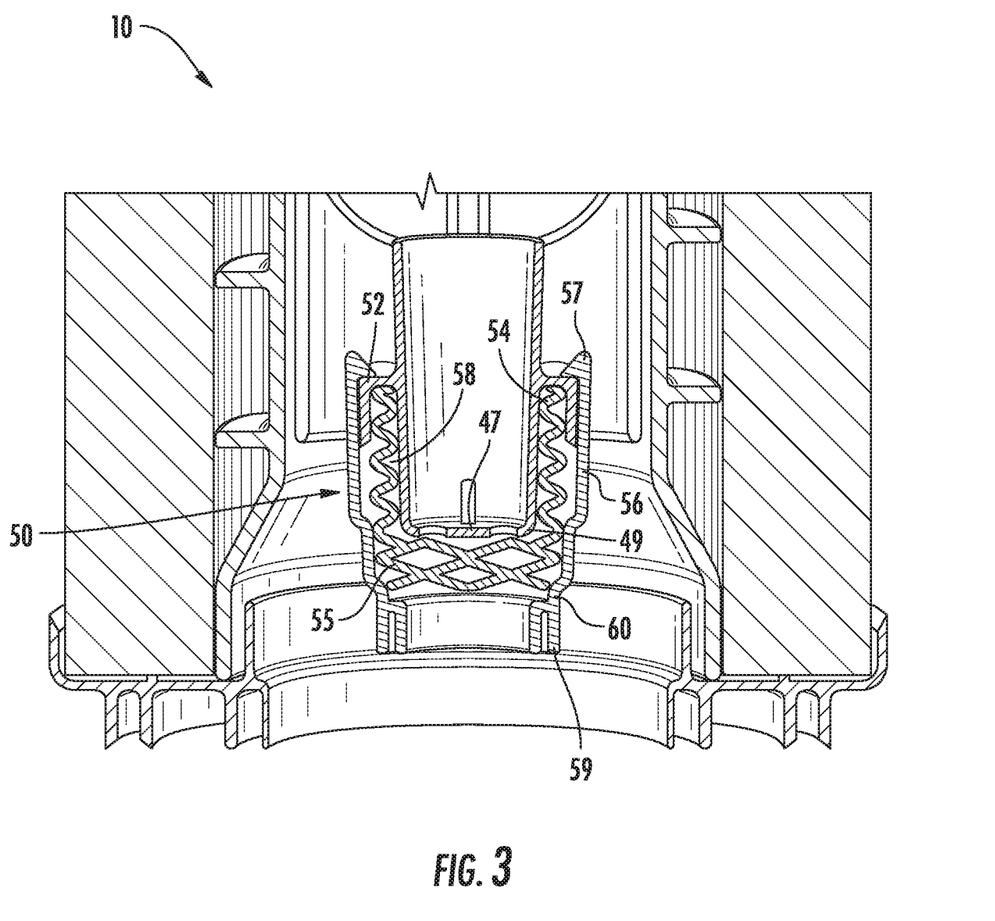
FIG. 3 is an enlarged cross-sectional view of the disclosed embodiment of FIG. 1 with particular emphasis on a bias member support assembly, a conduit and a second endcap.

As shown in FIGS. 1 and 3, the center tube 40 includes an interior and an exterior. On the exterior, a plurality of annular flanges 42 protrudes radially from the center tube 40. The flanges 42 establish an annular space 44 between the center tube 40 and the filter media 12 while also supporting the filter media 12. Clean fluid fills the space 44 before flowing through the apertures 26 into the center tube 40. On the interior, the center tube 40 defines a cylindrical cup-shaped reservoir 46. The reservoir 46 is arranged to receive fluid that passes through the apertures 26. The reservoir 46 communicates with a narrow annular conduit 48. The conduit 48 leads to a fluid return opening 49 of the center tube 40. An outlet valve actuator 47 is positioned coaxially within the return opening 49. As shown in FIG. 4, when the outlet valve actuator 47 engages the outlet valve 152 in the outlet 150 of the housing 100, clean fluid collected in the reservoir 46 leaves the filter element 10 through the return opening 49 and passes through outlet 150 in the housing 100 to return to the fluid circuit.

The support assembly 50 includes an annular shoulder 52 projecting radially from the conduit 48 of the center tube 40. The shoulder defines an annular slot 54. A coaxial sleeve 56 is contiguous with the shoulder 52 and defines an annular cavity 58. The shoulder 52 is oriented within the cavity 58 of the sleeve 56. The sleeve 56 includes a ramped stop 57 at a position above the shoulder 52, a base 60 and a guide ring 59 extending from the base 60. Within the annular cavity 58, a bias member 55 is captured between the annular slot 54 and the sleeve 56. The bias member 55 is captured in the annular slot 54 of the shoulder 52 at one end and at the base 60 of the sleeve 56 at another end. In the disclosed embodiment, the bias member 55 is a wave spring, but other compatible biasing mechanisms such as a coil spring (FIG. 5) may be used. The sleeve 56 is positioned to receive and exert force axially in a first direction toward the first endcap 20 and receive and exert force axially in a second direction toward the second endcap 30. Force applied to the sleeve 56 in the first direction causes the bias member 55 to compress. When the cover 122 is fastened to the housing 100, the bias member 55 is in a compressed position. Extension of the bias member 55 applies force on the sleeve 56 and causes the sleeve 56 to exert force in the second direction. During and after removal of the cover 122 from the housing 100, the bias member 55 is in an extended position.

Fastening the cover 122 to the housing 100 exerts a force on the first endcap 20 of the filter element 10 and pushes the filter element 10 axially toward the second end 130 of the housing 100. The exertion of force on the first endcap 20 causes the sleeve 56 to push against the second end 130 of the housing 100 and receive and exert force in the first direction causing compression of the bias member 55. When the bias member 55 is in the compressed position, the inlet valve actuator 34 applies sufficient force on the inlet valve 142 to open the inlet 140 and allow dirty fluid to flow into the housing 100. In the compressed position of the bias member 55, the return opening 49 also engages the outlet 150 and the outlet valve actuator 47 to open the outlet valve 152 and allow clean fluid to leave the housing 100.

Removal of the cover 122 from the housing 100 relieves force on the first endcap 20 of the filter element 10 causing the compressed bias member 55 to extend. The extension of the bias member 55 urges the sleeve 56 to push in the second direction. The sleeve 56 pushes off the second end 130 of the housing 100 and propels the filter element 10 axially in the first direction toward the first end 120 of the housing 100. In the extended position of the bias member 55, the inlet and outlet valve actuators 34, 47 disengage the inlet and outlet valves 142, 152, closing off the inlet 140 and the outlet 150 from fluid flow. As shown in FIG. 4, to close the inlet and outlet valves 142, 152, the inlet and outlet valve actuators 34, 47 must retreat in the first direction a distance $D_2$ that is less than the distance $D_1$. During removal of the cover 122, the seal 124 travels toward the upper edge of the housing 100 simultaneously with the inlet and outlet valve actuators 34, 47 retreating from the inlet and outlet valves 142, 152. The inlet and outlet valve actuators 34, 47 retreat sufficiently to close the inlet and outlet valves 142, 152 when the cover 122 is partially removed and the seal 124 has not yet reached the upper edge of the housing 100. Further, the inlet and outlet valves 142, 152 are closed before the seal 124 between the cover 122 and the housing 100 is broken and no longer effective.

Figure 6:
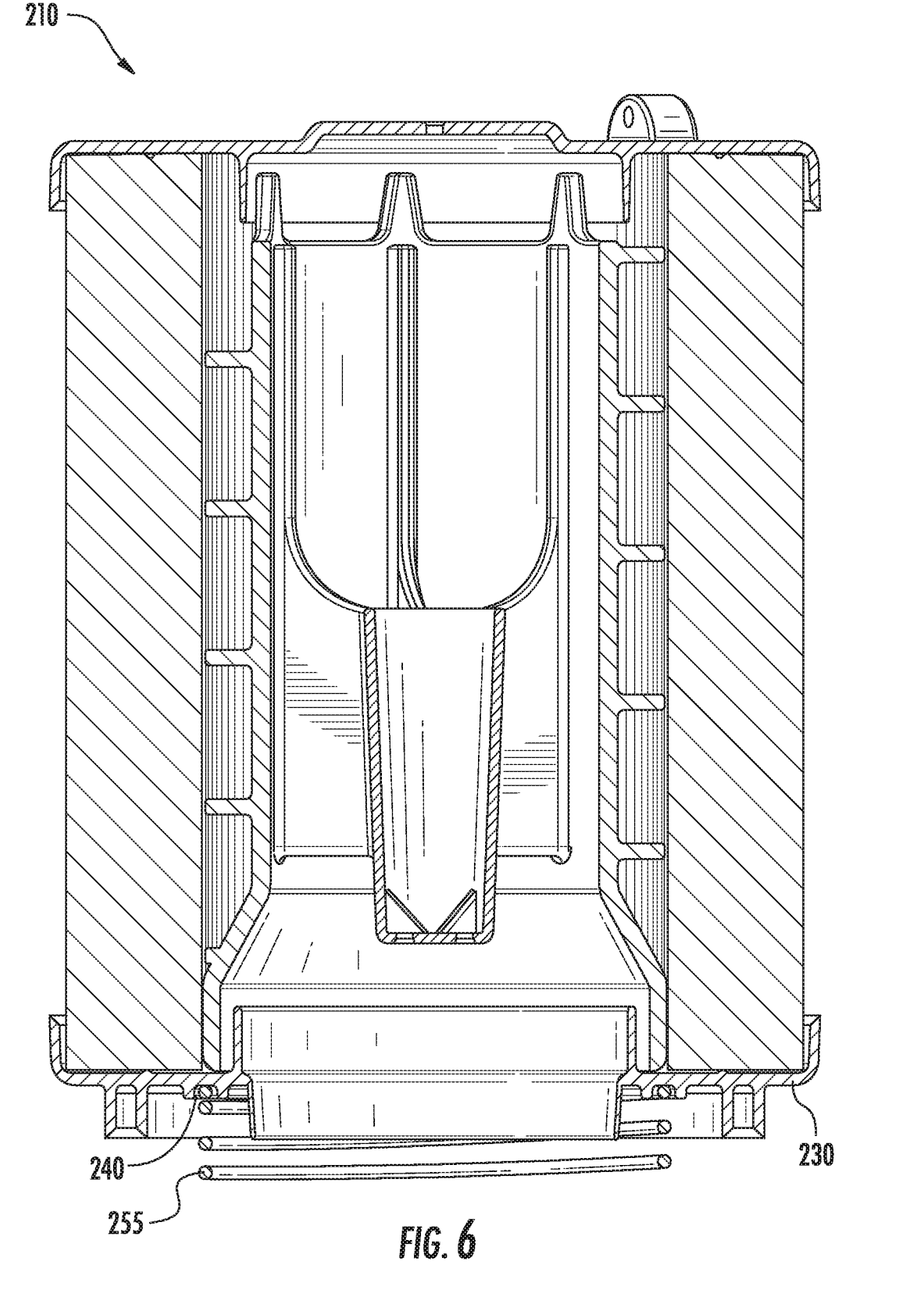
FIG. 6 is a front cross-sectional view of a second disclosed embodiment of the filter element according to aspects of the disclosure.
Figure 7:
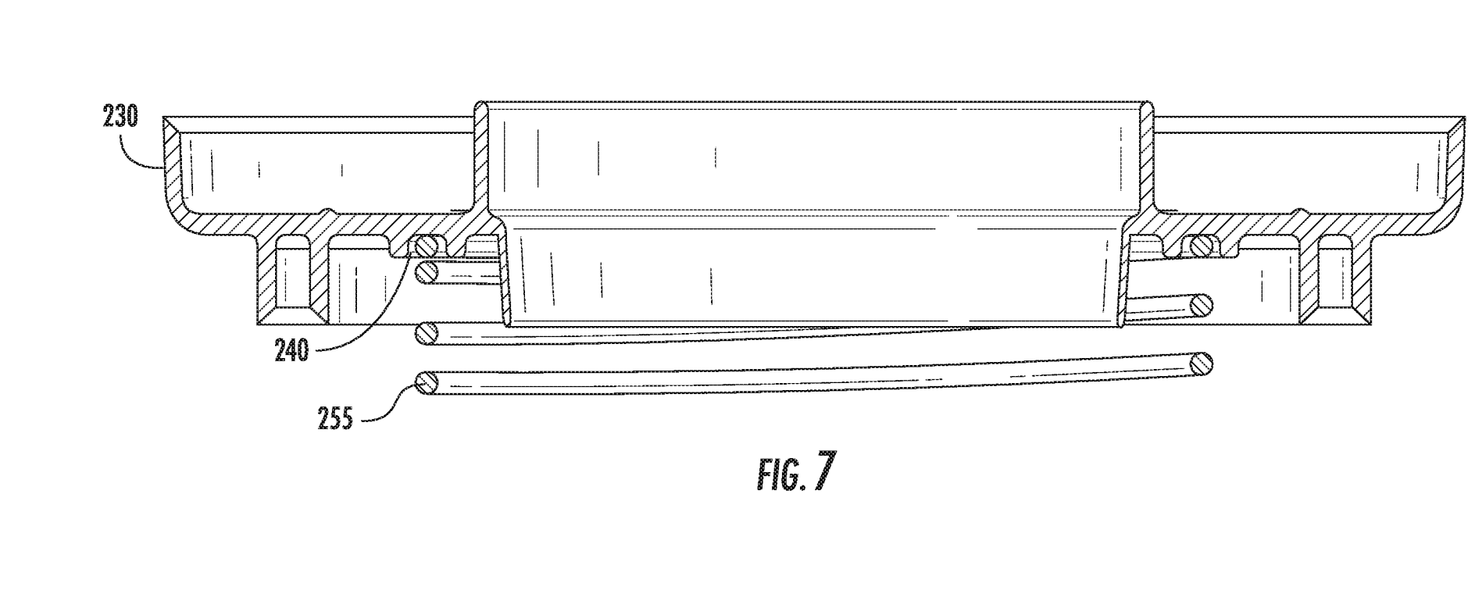
FIG. 7 is an enlarged cross-sectional view of the disclosed embodiment of FIG. 6 with particular emphasis on a bias member, a second endcap and an annular recess.

FIGS. 6 and 7 illustrate a second embodiment of a filter element 210, which is similar in structure and function to the filter element 10. The filter element 210 includes a bias member 255 captured in an annular recess 240 extending from a second (lower) endcap 230. The bias member 255 may be a coil spring. The bias member 255 extends toward the second end 130 of the housing 100.

The use of the terms "a" and "an" and "the" and similar referents in the context of describing the disclosed embodiment (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the disclosed embodiments and does not pose a limitation on the scope of the claims unless otherwise claimed. No language in the specification should be construed as indicating any non-claimed element as essential to the practice of the disclosed embodiments or claimed invention.

What is claimed:

1. A filter element for use in a housing of a filter assembly comprising:
a cylindrical ring of filter media circumscribing a longitudinal axis and extending axially between a first endcap and a second endcap having an inlet valve actuator;
a coaxial center tube circumscribed by the filter media and defining an opening;
a sleeve concentric with the center tube defining an annular cavity and surrounding a bias member captured between the sleeve and the center tube, the sleeve receiving and exerting force in a first and second direction,
wherein, an application of force on the first endcap causes the sleeve to exert force in the first direction compressing the bias member and a removal of the force from the first endcap causes the bias member to extend and urge the sleeve in the second direction.

2. The filter element of claim 1, wherein the urging of the sleeve in the second direction causes the filter element to move in the first direction.

3. The filter element of claim 1, wherein the center tube includes a radially projecting annular shoulder defining an annular slot, the annular shoulder positioned within the sleeve and the annular slot capturing a first end of the bias member.

4. The filter element of claim 1, wherein the center tube includes a radially projecting annular shoulder positioned within the sleeve and defining an annular slot, the bias member captured between the annular slot at one end and the sleeve at a another end, the bias member compressing when force is exerted on the first endcap and extending when force is removed from the first endcap.

5. The filter element of claim 1, wherein the sleeve includes a ramped stop abutted by an annular shoulder projecting radially from the center tube when the bias member is in an extended position.

6. The filter element of claim 1, wherein the inlet valve actuator is a ring protruding coaxially from the second endcap.

7. The filter element of claim 1, wherein the center tube defines a cup-shaped reservoir communicating with a conduit, the conduit leading to a return opening including an outlet valve actuator.

8. The filter element of claim 1, wherein the bias member is a wave spring.

9. A filter assembly comprising:
a housing having a first end and a second end, the housing including an inlet having an inlet valve and an outlet having an outlet valve;
a cover including a seal threaded to the first end of the housing;
a cylindrical ring of filter media circumscribing a longitudinal axis and extending axially between a first endcap and a second endcap having an inlet valve actuator, the filter media positioned within the housing;
a coaxial center tube circumscribed by the filter media and including a support assembly, wherein the support assembly includes a bias member surrounded by a sleeve, the sleeve exerting force in a first direction compressing the bias member in response to the cover being threaded to the housing and the bias member extending moving the sleeve in a second direction in response to removal of the cover from the housing;
wherein, in response to a force exerted on the first endcap the inlet valve actuator causes the inlet valve to open and in response to a removal of force exerted on the first endcap the support assembly causes the inlet valve to close.

10. The filter assembly of claim 9, wherein the support assembly includes a bias member.

11. The filter assembly of claim 9, wherein the support assembly includes a coil spring.

12. The filter assembly of claim 9, wherein threading the cover to the housing exerts a force on the first endcap and removing the cover relieves the force exerted on the first endcap.

13. The filter assembly of claim 9, wherein the seal is positioned a distance $D_1$ from an upper edge of the housing that is greater than a distance $D_2$ that the inlet valve actuator retreats to cause the inlet valve to close.

14. The filter assembly of claim 9, wherein during removal of the cover from the housing, the inlet and outlet valves are closed before the seal between the housing and the cover is no longer effective.

15. The filter assembly of claim 9, wherein the support assembly includes an annular shoulder projecting radially from the center tube and defining an annular slot, a coaxial sleeve concentric with the shoulder defining an annular cavity and surrounding a bias member, the bias member captured between the slot and the sleeve.

16. The filter assembly of claim 9, wherein the support assembly includes a bias member and receives and exerts force axially in a first direction causing compression of the bias member and receives and exerts force axially in a second direction in response to extension of the bias member.

17. A method of removing a filter element for use in a housing of a filter assembly having an inlet valve and an outlet valve, said method of removing the filter element comprising:
providing a cylindrical ring of filter media circumscribing a longitudinal axis and extending axially between a first endcap and a second endcap having an inlet valve actuator;
providing a coaxial center tube circumscribed by the filter media and having a support assembly, wherein the support assembly comprises a bias member which is positioned to receive force axially in a first direction causing compression of the bias member and positioned to exert force in a second direction in response to extension of the bias member;
wherein, in response to a force exerted on the first endcap the inlet valve actuator engages the inlet valve and in response to a removal of force exerted on the first endcap the support assembly causes the inlet valve actuator to disengage the inlet valve.

18. The method of removing a filter element for use in a housing from claim 17, wherein the step of providing a coaxial center tube having a support assembly includes the support assembly comprising a bias member and receiving force axially in a first direction in response to an exertion of force on the first endcap and receiving force in a second direction in response to a removal of force on the first endcap.

* * * * *